US008366803B2

(12) United States Patent
Lee (10) Patent No.: US 8,366,803 B2
(45) Date of Patent: Feb. 5, 2013

(54) AIR CLEANER HAVING REGENERATIVE FILTER, AND METHOD FOR REGENERATIVE OF AIR CLEANER FILTER

(75) Inventor: Hyun Jae Lee, Daejeon (KR)

(73) Assignee: Enbion Inc., Daejeon (KR)

( * ) Notice: Subject to any disclaimer, the term of this patent is extended or adjusted under 35 U.S.C. 154(b) by 386 days.

(21) Appl. No.: 12/597,375

(22) PCT Filed: Apr. 23, 2008

(86) PCT No.: PCT/KR2008/002294
§ 371 (c)(1),
(2), (4) Date: Mar. 31, 2010

(87) PCT Pub. No.: WO2008/130185
PCT Pub. Date: Oct. 30, 2008

(65) Prior Publication Data
US 2010/0180763 A1    Jul. 22, 2010

(30) Foreign Application Priority Data

Apr. 23, 2007    (KR) .................. 10-2007-0039103

(51) Int. Cl.
*B01D 53/06*    (2006.01)
(52) U.S. Cl. .................. 95/11; 95/113; 95/148; 96/111; 96/113; 96/125
(58) Field of Classification Search ............... 95/21, 92, 95/113, 148, 14, 123, 126; 96/125, 134, 96/142, 144, 127, 146, 152; 422/121, 122, 422/186.04, 186.06; 210/284, 670; 62/94, 62/271; 431/151, 285, 326
See application file for complete search history.

(56) References Cited

U.S. PATENT DOCUMENTS

| | | | | |
|---|---|---|---|---|
| 5,758,508 A * | 6/1998 | Belding et al. | ..................... | 62/94 |
| 6,458,185 B1 | 10/2002 | Reiter et al. | | |
| 7,018,447 B2 * | 3/2006 | McAnespie | ..................... | 95/113 |
| 7,323,146 B2 * | 1/2008 | Kim et al. | ................. | 422/186.06 |
| 7,338,548 B2 * | 3/2008 | Boutall | ............. | 95/14 |
| 7,563,306 B2 * | 7/2009 | Boutall et al. | .................. | 95/113 |
| 7,740,810 B2 * | 6/2010 | Hay et al. | ................. | 422/186.04 |
| 8,003,058 B2 * | 8/2011 | Bergeron et al. | ......... | 422/186.04 |
| 8,052,783 B2 * | 11/2011 | Baker | ............ | 96/125 |
| 2002/0035923 A1 * | 3/2002 | Fukuhori et al. | ................ | 95/113 |
| 2005/0217482 A1 * | 10/2005 | McAnespie | ..................... | 95/113 |
| 2008/0011662 A1 * | 1/2008 | Milosavljevic et al. | ...... | 210/284 |
| 2008/0193326 A1 * | 8/2008 | Mole | ................ | 422/2 |
| 2009/0314160 A1 * | 12/2009 | Meijer | ............ | 95/148 |
| 2009/0320678 A1 * | 12/2009 | Chang et al. | ..................... | 95/92 |
| 2010/0050866 A1 * | 3/2010 | Yu et al. | ............................ | 95/21 |
| 2010/0296966 A1 * | 11/2010 | Bae et al. | .......................... | 422/4 |
| 2011/0011803 A1 * | 1/2011 | Koros | ........................... | 210/670 |

FOREIGN PATENT DOCUMENTS

| | | |
|---|---|---|
| JP | 10015332 | 1/1998 |
| JP | 10337436 | 12/1998 |
| JP | 2007083238 | 4/2007 |

\* cited by examiner

*Primary Examiner* — Duane Smith
*Assistant Examiner* — Minh-Chau Pham
(74) *Attorney, Agent, or Firm* — The Webb Law Firm

(57) ABSTRACT

The invention relates to an air cleaner, and more particularly to an air cleaner which includes a regenerative deodorizing filter to purify and treat gaseous substances contained in air, thus enabling efficient regeneration of the regenerative deodorizing filter, and a method of regenerating the filter of the air cleaner.

15 Claims, 8 Drawing Sheets

AIR CLEANER HAVING REGENERATIVE FILTER, AND METHOD FOR REGENERATIVE OF AIR CLEANER FILTER

BACKGROUND OF THE INVENTION

1. Field of the Invention

The present invention relates to an air cleaner, and, more particularly, to an air cleaner which is provided with a regenerative deodorizing filter to efficiently treat offensive odors, volatile organic compounds, detrimental constituents and the like, and a method of regenerating the regenerative deodorizing filter of the air cleaner.

2. Description of the Related Art

Generally, an air cleaner is extensively used in homes, public facilities and industrial facilities, as means for treating particulate substances, bacteria, offensive odors, volatile organic compounds, detrimental constituents and the like and thus provide pleasant clean air.

The air cleaner is typically comprised of a plurality of filters for treating particulate substances such as dust and bacteria, and a deodorizing filter for treating gaseous substances such as offensive odors, volatile organic compounds, detrimental constituents and the like.

In the field of the filter, which is designed to treat particulate substances, a filter which is adapted to employ the sieving effect for particulate substances, and an electrostatic precipitation filter which is adapted to employ static electricity, are predominantly used. Meanwhile, in the field of the deodorizing filter, which is designed to treat gaseous substances, a fixed-bed adsorption filter which is adapted to use activated carbon and zeolite, an ozone oxidation filter which is adapted to use ozone, and a photocatalytic filter which is adapted to use photocatalyst, are predominantly used.

Among these, in the fixed-bed adsorption filter adapted to use activated carbon and zeolite, there are unfavorable drawbacks in that an amount of equilibrium adsorption at a low concentration is decreased, constituents adsorbed on the filter are desorbed depending on the exterior environment including an external temperature and a concentration because the constituents are adsorbed on the filter due to the physical bonding, and it does not have regenerative capacity by itself thus causing the shortened service life.

In the ozone oxidation filter, which is a system adapted to employ the oxidizability of ozone, although the filter can be used over a prolonged period of time without the replacement, it has drawbacks in that since it uses ozone, which is environmental pollutant, the ozone, which has not been yet reacted and then discharged to the atmosphere, may cause asthma, allergy and the like.

Further, in the air cleaner which use a photocatalytic filter, as disclosed in Korean Unexamined Patent Publication No. 10-2005-66353, there are unfavorable drawbacks in that the reaction rate at which the photocatalyst reacts detrimental constituents is decreased, it is difficult to conduct the uniform ultraviolet irradiation, and there is generation of accessory detrimental constituents such as ozone during the reaction process.

SUMMARY OF THE INVENTION

Accordingly, the present invention has been made keeping in mind the above problems occurring in the prior art, and an object of the present invention is to provide an air cleaner equipped with a generative deodorizing filter and a method of regenerating the regenerative deodorizing filter of the air cleaner, which is designed into a system adapted to regenerate a deodorizing filter suitable for the treatment of various offensive odors, volatile organic compounds and detrimental constituents, thus offering the desirable constant deodorizing efficiency over the prolonged period of time and thus more efficient air cleaning.

In order to accomplish the above object, the present invention provides an air cleaner including: at least one filter to purify and treat particulate substances contained in air introduced therein; a regenerative deodorizing filter to adsorb gaseous substances such as offensive odors, volatile organic compounds and detrimental gas contained in the air introduced therein for purification and treatment; and desorption means to desorb and treat the gaseous substances adsorbed on the regenerative deodorizing filter so that the regenerative deodorizing filter is continuously regenerated.

The regenerative deodorizing filter may include an adsorption section defined by a circular segment having a predetermined circumferential angle, and a desorption section defined by the remaining circular segment other than the adsorption section, and the regenerative deodorizing filter includes a rotary rotor, which is rotatably installed in the filter.

The rotary rotor may be made of single component or multiple components selected from among zeolite, activated alumina, porous silica, activated carbon and diatomite, which have a high adsorptive capacity with respect to gaseous substances, and the rotary rotor may include a support having a low air resistance, and single component or multiple components selected from among zeolite, activated alumina, porous silica, activated carbon and diatomite, which are applied to the support and have a high adsorptive capacity with respect to gaseous substances.

Also, the desorption means may include: a heating unit to heat air supplied to the desorption section of the regenerative deodorizing filter; a desorption air treatment unit to purify and treat gaseous substances contained in the air introduced therein, in which the air is heated by the heating unit and is passed through the desorption section while entraining the gaseous substances; and an air transfer unit to enable the air, which is purified and treated by the desorption air treatment unit, to be discharged outside or to be introduced into the regenerative deodorizing filter for retreatment.

Also, the desorption means may include: a heat exchanger through which air directed to the desorption section of the regenerative deodorizing filter passes; a desorption air treatment unit to purify and treat gaseous substances contained in the air introduced therein, in which the air is passed through the heat exchanger and is passed through the desorption section while entraining the gaseous substances; and an air transfer unit to enable the air, which is purified and treated by the desorption air treatment unit and is passed through the heat exchanger while exchanging heat with air directed to the desorption sector of the regenerative deodorizing filter, to be discharged outside or to be introduced into the regenerative deodorizing filter for retreatment.

Also, the desorption means may include: a heating unit to heat air supplied to the desorption section of the regenerative deodorizing filter; a heat exchanger through which the air, which is passed through the heating unit and is passed through the desorption section while entraining gaseous substances therein, passes; a desorption air treatment unit to purify and treat gaseous substances contained in the air, which is passed through the heat exchanger and is introduced therein; and an air transfer unit to enable the air, which is purified and treated by the desorption air treatment unit and is passed through the heat exchanger while exchanging heat with air passed through the desorption sector of the regenerative deodorizing filter, to be discharged outside or to be introduced into the regenerative deodorizing filter for retreatment.

In this case, the heating unit may be positioned between the heat exchanger and the air transfer unit so that air passed through the heat exchanger exchanges heat with air supplied to the desorption section of the regenerative deodorizing filter.

The regenerative deodorizing filter may include an adsorption section defined by a circular segment having a predetermined circumferential angle, and cooling and desorption sections defined by the remaining circular segment other than the adsorption section, and the regenerative deodorizing filter includes a rotary rotor, which is rotatably installed in the filter.

In this case, the desorption means may include: a heating unit to heat air passed through the cooling section of the regenerative deodorizing filter and to supply the air to the desorption section; a desorption air treatment unit to purify and treat gaseous substances contained in the air introduced therein, in which the air is heated by the heating unit and is passed through the desorption section while entraining the gaseous substances; and an air transfer unit to enable the air, which is purified and treated by the desorption air treatment unit and is passed through the heating unit while exchanging heat with air passed through the cooling section, to be discharged outside or to be introduced into the regenerative deodorizing filter for retreatment.

Also, the desorption means may include: a heating unit to heat air passed through the cooling section of the regenerative deodorizing filter and to supply the air to the desorption section; a heat exchanger to exchange heat with the air, which is heated by the heating unit and is passed through the desorption section while entraining gaseous substances therein; a desorption air treatment unit to purify and treat the gaseous substances contained in the air passed through the heat exchanger; and an air transfer unit to enable the air, which is purified and treated by the desorption air treatment unit and is passed through the heat exchanger while exchanging heat with air passed through the desorption section, to be discharged outside or to be introduced into the regenerative deodorizing filter for retreatment.

Also, the desorption means may include: an air transfer unit to draw air into the desorption section of the regenerative deodorizing filter; a pressure-regulating unit to regulate a pressure of air supplied to the regenerative odorizing filter; and a desorption air treatment unit to purify and treat gaseous substances contained in the air passed through the regenerative deodorizing filter by the air transfer unit.

The desorption air treatment unit may include one or more selected from among a catalytic oxidation unit, an absorbent adsorption unit, a cold condensation unit, a photocatalytic treatment unit and an ozone oxidation unit, and the desorption air treatment unit may be a catalytic oxidation unit which comprises a heater to heat interior air to a predetermined temperature, and a catalytic layer to catalytically oxidize and thus burn gaseous substances contained in air introduced therein.

The air supplied to the desorption section of the regenerative deodorizing may be heated to a temperature ranging from 50° C. to 300° C.

The air passed through the desorption air treatment unit may be maintained in a temperature ranging from 50° C. to 400° C.

The heater may preheat the interior of the desorption air treatment unit to a temperature of 50° C. or more.

The air cleaner may further include a post-treatment filter which is configured to purify and treat substances, which remain in the air passed through the regenerative deodorizing filter and introduced therein and is not yet purified and treated, and to apply negative ions and far infrared rays to the air.

In another aspect, the present invention provides a method of regenerating the regenerative deodorizing filter of the air cleaner, the method comprising: (a) purifying and treating particulate substances contained in introduced air using a filter; (b) purifying and treating gaseous substances contained in introduced air using a regenerative deodorizing filter; and (c) desorbing the gaseous substances adsorbed on the regenerative deodorizing filter for purification and treatment, thus enabling continuous regeneration of the regenerative deodorizing filter.

DETAILED DESCRIPTION OF THE PREFERRED EMBODIMENTS

1: air cleaner
2, 20: filter for removing particulate substances
30: regenerative deodorizing filter
32: adsorption section
34: desorption section
34a: cooling section
36: adsorption rotor
40, 50: post-treatment filter
60: air transfer unit
100, 200, 300, 400, 500, 600: desorption means
110, 410, 610: heating unit
120, 230, 320, 430, 520, 630: desorption air treatment unit
122, 322, 432, 522, 632: heater
124, 324, 434, 524, 634: catalytic layer
130, 220, 330, 440, 530, 640: desorption air transfer unit
140: gas sensor
210: air pressure-regulating unit Hereinafter, the present invention will be described in more detail, with reference to the embodiments shown in the accompanying drawings.

Figure 1:
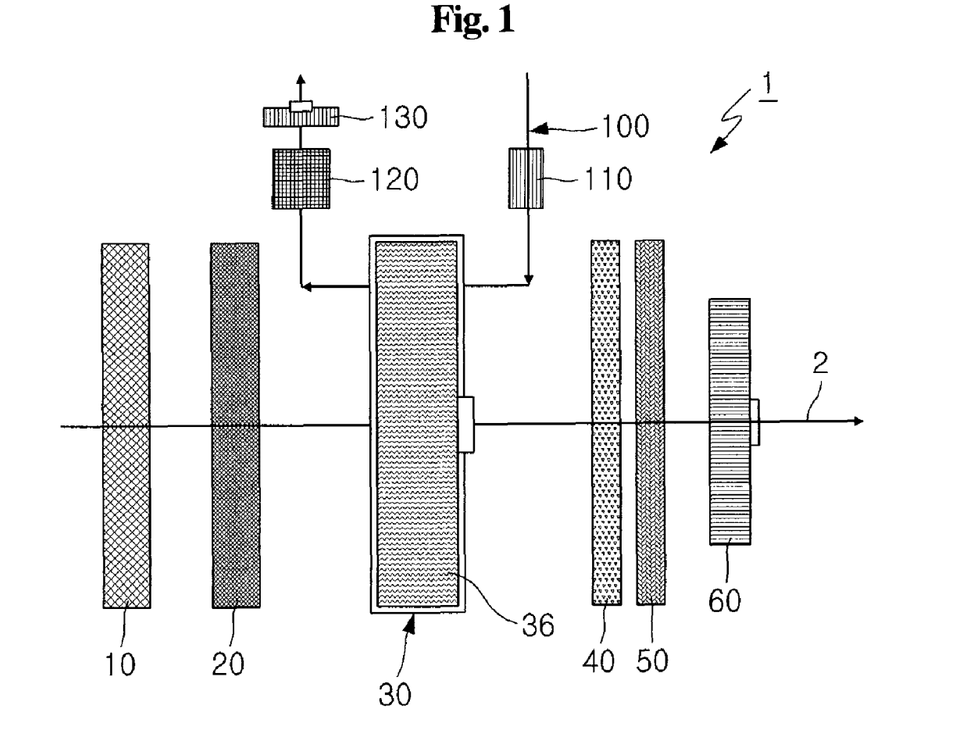
FIG. 1 is a schematic view showing a configuration of an air cleaner according to a first embodiment of the present invention.
Figure 2:
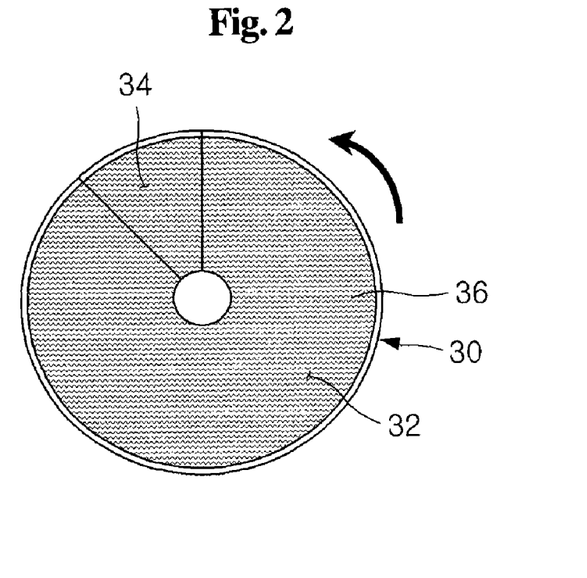
FIG. 2 is a front view showing a regenerative deodorizing filter incorporated in the air cleaner of FIG. 1.

FIG. 1 is a schematic view showing a configuration of an air cleaner according to a first embodiment of the present invention, and FIG. 2 is a front view showing a regenerative deodorizing filter incorporated in the air cleaner of FIG. 1.

As shown in the drawings, the air cleaner 1 according to the first embodiment of the present invention comprises a coarse filter 10 for removing coarse particulate substances, a fine filter 20 for removing fine particulate substance, a regenerative deodorizing filter 30, a plurality of post-treatment filter 30, and an air transfer unit 60, all of which are sequentially disposed in this order along an air transfer path 2.

In this configuration, the filters 10, 20, 40, 50, other than the regenerative odorizing filter 30, may be changed in the disposition sequence and may be further provided or removed, if required.

Although each of the coarse filter 10 for removing coarse particulate substances and the fine filter 20 for removing fine particulate substances is not limited to the number, it is preferably provided in a plural number so as to achieve efficient removal of dust, bacteria and the like. The filters may include an air filter, a medium filter, an HEPA filter and the like, which are well known in the art, and may include an electrostatic precipitation type electrostatic filter in some cases.

As shown in FIG. 2, the regenerative deodorizing filter 30 comprises an adsorption section 32 defined by a circular segment having a predetermined circumferential angle and on which gaseous substances are adsorbed, and a desorption section 34 defined by the remaining circular segment other than the adsorption section 32 and from which the gaseous substances are desorbed by virtue of the desorbing energy. The regenerative deodorizing filter 30 further includes an adsorption rotor 36 therein, which is installed to be rotated.

The adsorption rotor 36 may be operated in such a way that it conducts the repetitive adsorption and desorption for gaseous substances while continuously rotating. More specifically, the adsorption rotor may be operated in such a way that it first conducts only the adsorption operation without the rotation, and then conducts the desorption operation while rotating when the adsorption section 32 reaches the breakthrough point after elapse of a predetermined period of time.

The adsorption rotor 36 in the regenerative deodorizing filter 30 may be prepared in such a manner that a starting material comprised of single component or multiple components selected from among zeolite, porous silica, activated alumina, activated carbon and diatomite is formed into a desired shape, or a bent honeycombed support, which is excellent in air permeability, is coated with the adsorbing component.

The post-treatment filter 40 and 50 function to further treat the particulate substances and the gaseous substance remaining in the air flowed from the regenerative deodorizing filter 30 to make them more clean, or to emit antibacterial agent such as negative ions, far-infrared rays, etc., to make air more pleasant. Subsequently, the air, which is flowed from the post-treatment filters 40 and 50, is discharged to the outside of the air cleaner 1 by virtue of the air transfer unit 60.

The gaseous substances, adsorbed on the adsorption rotor 36 of the regenerative deodorizing filter 30, is desorbed from the filter in the desorption section by desorption means 100, which will be described later, due to the rotation of the adsorption rotor 36.

The desorption means 100 comprises a heating unit 110 which is intended to heat the air, introduced in the desorption section 34 of the regenerative deodorizing filter 30, to the adsorption temperature or higher, an desorption air treatment unit 120 which is intended to purify the air containing the gaseous substances desorbed from the desorption section 34, and a desorption air transfer unit 130 which is intended to blow the air flowed from the desorption air treatment unit 120.

In this regard, a temperature of the air, which is heated using the heating unit 110, may be within a range from 50° C. to 700° C., and preferably within a range from 50° C. to 300° C.

Although the desorption air treatment unit 120 is preferably operated through a catalytic oxidation, it may be operated through any of an adsorption by absorbent, a cold condensation, a treatment by photocatalyst, an oxidation by ozone, and a combination thereof without limitation.

In the case of an installation site at which the air that contains gaseous substances desorbed from the desorption section 34 of the regenerative deodorization filter 30 can be discharged outside, the air containing the desorbed gaseous substances may be directly discharged outside. However, since a typical air cleaner is operated in an enclosed space, it is preferable to have the desorption air treatment unit 120 as mentioned above, and it is further preferable to introduce the air, flowed from the desorption air treatment unit 120, into the air cleaner 1 again for the retreatment.

The process of purifying air using the air cleaner 1, which is constructed in the above-described manner, will be described below.

Air is first introduced into the air cleaner 1, and particulate substances such as dust, bacteria, etc., contained in the air are filtered by the coarse filter 10 and the fine filter 20. As the air, from which the particulate substances are removed, passes through the regenerative deodorizing filter 30, gaseous substances such as offensive odors, volatile organic compounds and detrimental constituents are filtered. Thereafter, when the air, from which the gaseous substances are removed, passes through the post-treatment filters 40 and 50, negative ions, far-infrared rays and antibacterial substances such as catechin are applied to the air, and the air is then discharged into the interior of room through the air transfer unit 60.

The gaseous substances, which are filtered while passing through the regenerative deodorizing filter 30, are adsorbed on the adsorption rotor 36 which is rotatably provided in the regenerative deodorizing filter 30. As the adsorption rotor 36 is rotated, the gaseous substances are desorbed from the filter by the desorption means 100 associated with the desorption section 34, and thus the regenerative deodorizing filter is regenerated.

In other words, as air, which is heated to a predetermined temperature by the heating unit 110 installed in association with the desorpiton section 34 of the regenerative deodorizing filter 30, is blown through the regenerative deodorizing filter, the gaseous substances, adsorbed on the region of the adsorption rotor which is positioned at the adsorption section 34, are desorbed from the filter. Subsequently, the gaseous substances, which are desorbed from the filter, are purified and treated through the desorption air treatment unit 120, and are then introduced into the air cleaner 1 again by the desorption air transfer unit 130 for the retreatment.

At this point, the air containing the gaseous substances desorbed from the desorption section 34 may be discharged to the outside of the room.

As such, since the adsorption rotor 36 is configured to be rotatable, the entire area of the adsorption rotor is progressively passed over by the desorption section 34 by virtue of the rotation of the adsorption rotor, so that the gaseous substance adsorbed on the entire area of the adsorption rotor 36 can be desorbed therefrom, and can be thus regenerated.

Figure 3:
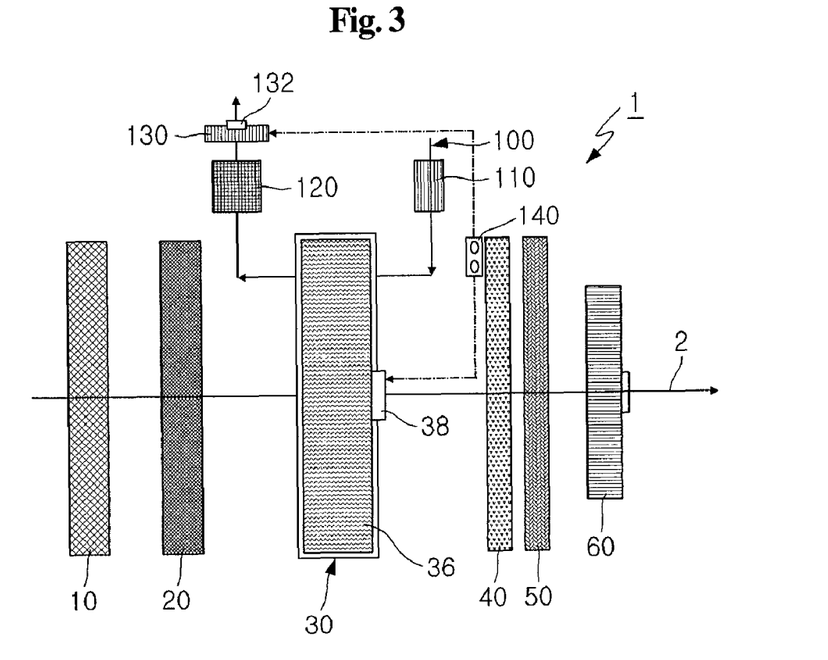
FIG. 3 is a view showing a variant embodiment in which a gas sensor is disposed beside a side of the regenerative deodorizing filter according to the first embodiment of the present invention.

FIG. 3 is a view showing a variant embodiment in which a gas sensor is disposed beside a side of the regenerative deodorizing filter according to the first embodiment of the present invention. As shown in the drawing, this air cleaner may be operated in such a manner that the gas sensor 140 detects the concentration of gaseous substances adsorbed on the regenerative deodorizing filter 30, and whether the regenerative deodorizing filter 30 must be regenerated is determined based on the detected concentration, followed by conduction of the desorption operation depending on the detected result.

More specifically, when the concentration of the gaseous substances adsorbed on the regenerative deodorizing filter 30 is equal to or higher than a predetermined value, a drive unit 38 of the regenerative deodorizing filter 30 and a drive unit 132 of the desorption air transfer unit 130 are operated, thus regenerating the regenerative deodorizing filter 30. In contrast, the concentration of the gaseous substances is lower than the predetermined value, the operation of the drive unit 38 and the drive unit 132 is not conducted, thus achieving realization of the optimal treatment efficiency thanks to the low operational cost.

In other words, the amount of gaseous substances adsorbed on the regenerative deodorizing filter 30 inevitably varies depending on the conditions where the air cleaner 1 is used, and thus the frequency of replacement varies. In the conditions where the environmental contamination is relatively low, when the regenerative deodorizing filter 30 and the desorption means 100 are continuously operated without cease, undesired operational cost may be brought about. Accordingly, as in this configuration, it is preferable that the regenerating operation of the regenerative deodorizing filter 30 is timely conducted depending on the concentration of the gaseous substances adsorbed on the regenerative deodorizing filter 30.

Figure 4:
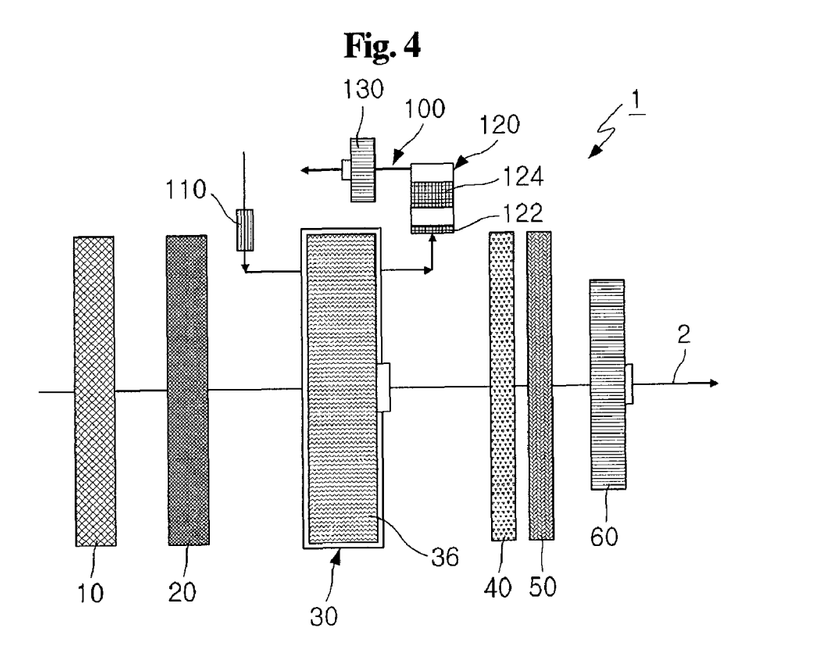
FIG. 4 is a view showing a variant embodiment in which a catalytic oxidation unit is applied as the desorption air treatment unit in the air cleaner according to the first embodiment of the present invention.

FIG. 4 is a view showing a variant embodiment in which a catalytic oxidation unit is applied as the desorption air treatment unit in the air cleaner according to the first embodiment of the present invention. As shown in the drawing, the catalytic oxidation unit, which is applied as the desorption air treatment unit 120, may comprise a heater 122 for heating the interior of the unit, and a catalytic layer 124 for catalytically oxidizing and burning gaseous substances passing therethrough.

In this context, it is preferable that the heater 122 heats the interior of the catalytic oxidation unit 120 to a temperature of 50° C. or more, and the temperature at which the gaseous substances are oxidized and decomposed is optimally maintained in a range from 50° C. to 400° C.

Figure 5:
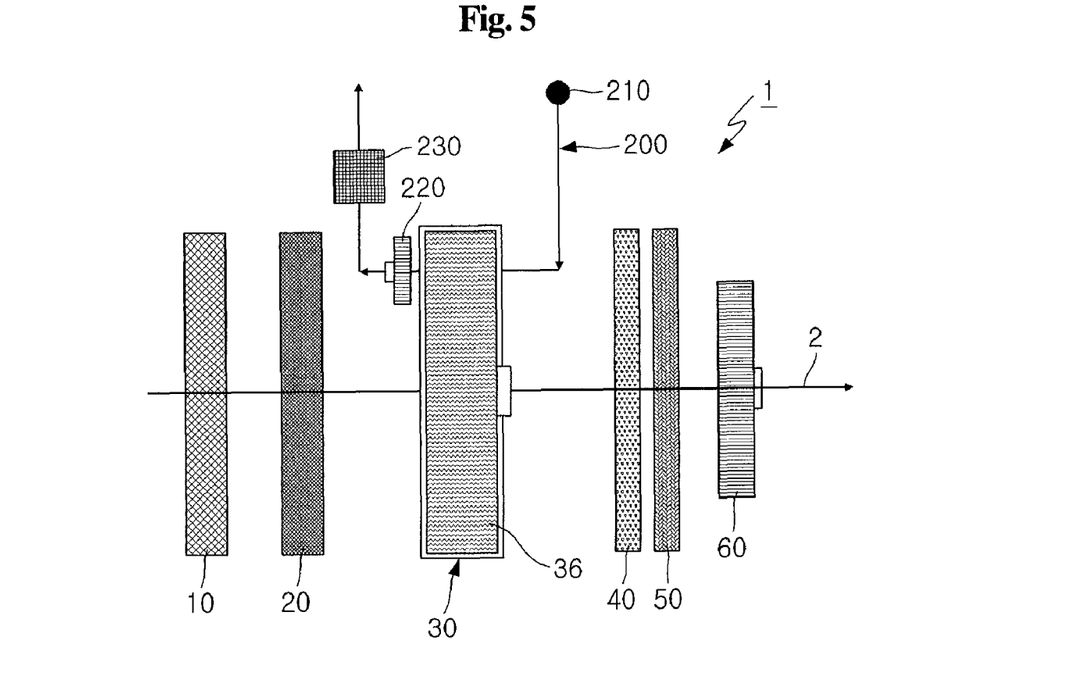
FIG. 5 is a schematic view showing a configuration of an air cleaner according to a second embodiment of the present invention.

FIG. 5 is a schematic view showing a configuration of an air cleaner according to a second embodiment of the present invention.

In the description of the second embodiment of the present invention, the same reference numerals are used throughout the description to designate the same as or similar to components disclosed in the first embodiment, and the redundant description relating to the components is omitted for clarity.

The air cleaner 1 according to the second embodiment of the present invention is configured such that the desorption means of the regenerative deodorizing filter is replaced with a different desorption means that employs a desorption by a pressure rather than high temperature.

The desorption means 200 comprises a pressure-regulating unit 210 for regulating a pressure of air supplied to the desorption section 34, a desorption air transfer unit 220 for drawing in the air that has been regulated in pressure through the pressure-regulating unit 210 and thus causing the air to pass through the desorption section 34 of the regenerative deodorizing filter 30, thereby realizing the desorption of gaseous substances, and a desorption air treatment unit 230 for purifying and treating the air, which is drawn by the desorption air transfer unit 220 and contains the desorbed gaseous substances.

Although the desorption air treatment unit 230 is preferably operated through a catalytic oxidation, it may be operated through any of an adsorption by absorbent, a cold condensation, a treatment by photocatalyst, an oxidation by ozone, and a combination thereof without limitation.

The process of purifying air using the air cleaner, which is constructed in the above-described manner, will be described below.

Air is first introduced into the air cleaner 1, and particulate substances such as dust, bacteria, etc., contained in the air are filtered by the coarse filter 10 and the fine filter 20. As the air, from which the particulate substances are removed, passes through the regenerative deodorizing filter 30, gaseous substances such as offensive odors, volatile organic compounds and detrimental constituents are filtered. Thereafter, when the air, from which the gaseous substances are removed, passes through the post-treatment filters 40 and 50, negative ions, far-infrared rays and antibacterial substances such as catechin are applied to the air, and the air is then discharged into the interior of room through the air transfer unit 60.

The gaseous substances, which are filtered while passing through the regenerative deodorizing filter 30, are adsorbed on the adsorption rotor 36 which is rotatably provided in the regenerative deodorizing filter 30. As the adsorption rotor 36 is rotated, the gaseous substances are desorbed from the filter by the desorption means 200 associated with the desorption section 34, and thus the regenerative deodorizing filter is regenerated.

In other words, as air, which is regulated to a predetermined pressure by the pressure-regulating unit 210 installed in association with the desorpiton section 34 of the regenerative deodorizing filter 30, is blown through the regenerative deodorizing filter, the gaseous substances, adsorbed on the region of the adsorption rotor 36 which is positioned at the adsorption section 34, are desorbed from the filter. Subsequently, the gaseous substances, which is desorbed from the filter, are purified and treated through the desorption air treatment unit 230.

In this regard, the desorption air transfer unit 220 draws in the air, which has been regulated in pressure by the pressure-regulating unit 210, so that the air is flowed from the desorption section 34, and then transfers the air to the adsorption air treatment unit 230.

Figure 6:
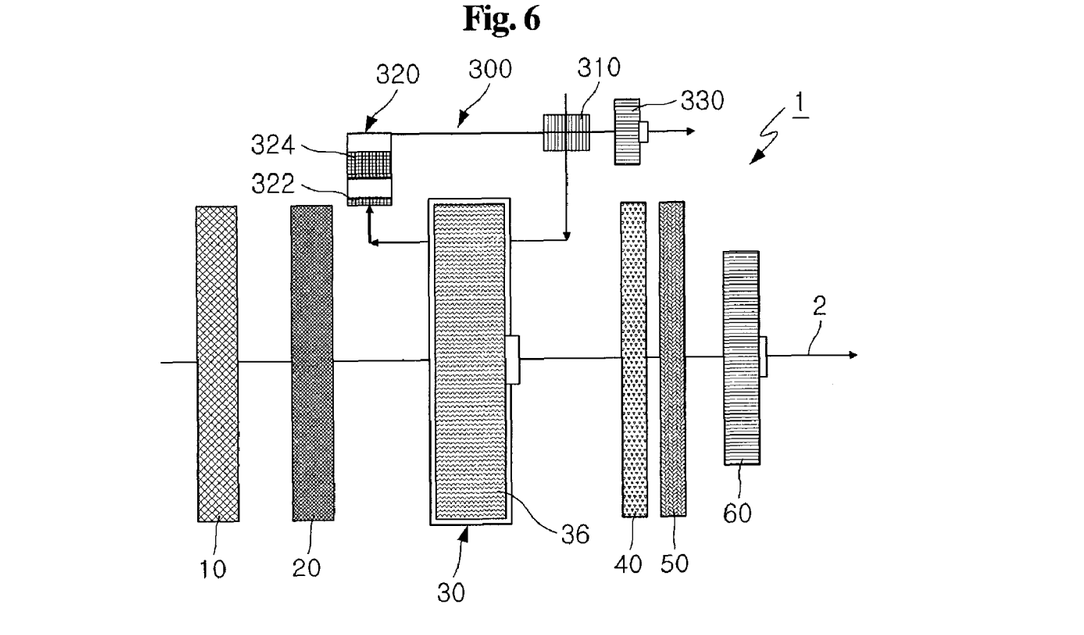
FIG. 6 is a schematic view showing a configuration of an air cleaner according to a third embodiment of the present invention.

FIG. 6 is a schematic view showing a configuration of an air cleaner according to a third embodiment of the present invention.

In the description of the third embodiment of the present invention, the same reference numerals are used throughout the description to designate the same as or similar to components disclosed in the first and second embodiments, and the redundant description relating to the components is omitted for clarity.

The air cleaner 1 according to the third embodiment of the present invention is configured such that the desorption means of the regenerative deodorizing filter 30 is operated to desorb gaseous substances using high temperature, in which a desorption air treatment unit 320 is applied as the catalytic oxidation unit.

The desorption means 300 comprises a heat exchanger 310 for exchanging air, supplied to the desorption section 34, with heat and thus heating the air, a catalytic oxidation unit 320 for purifying and treating the air, which contains gaseous substances desorbed from the desorption section 34, by the heated air flowed from the heat exchanger 310, and a desorption air transfer unit 330 for blowing out the air flowed from the catalytic oxidation unit 320.

The catalytic oxidation unit 320 comprises a heater 322 for preheating the interior of the catalytic oxidation unit to a temperature of 50° C. or more, and a catalytic layer 324 for oxidizing and decomposing the air introduced therein. Here, although the optimal temperature at which the gaseous substances are oxidized and decomposed is preferably in a range from 50° C. to 400° C., the optimal temperature may vary depending on the constituent concentration of the gaseous substances.

The air, which has been purified and treated through the catalytic oxidation unit 320 and has a high temperature, is introduced into the heat exchanger 310 where the air exchanges the air, which is supplied to the desorption section 34 of the regenerative deodorizing filter 340, with heat, thus heating the air supplied to the desorption section 34 to a high temperature of a range from 50° C. to 300° C. Subsequently, the air is discharged outside through the desorption air transfer unit 330, or is further introduced into the upstream end of the regenerative deodorizing filter 30 such that the gaseous substances remaining in the air is further treated.

The process of purifying air using the air cleaner, which is constructed in the above-described manner, will be described below.

Air is first introduced into the air cleaner, and particulate substances such as dust, bacteria, etc., contained in the air are filtered by the coarse filter 10 and the fine filter 20. As the air, from which the particulate substances are removed, passes through the regenerative deodorizing filter 30, gaseous substances such as offensive odors, volatile organic compounds and detrimental constituents are filtered. Thereafter, when the air, from which the gaseous substances are removed, passes through the post-treatment filters 40 and 50, negative ions, far-infrared rays and antibacterial substances such as catechin are applied to the air, and the air is then discharged into the interior of room through the air transfer unit 60.

The gaseous substances, which are filtered while passing through the regenerative deodorizing filter 30, are adsorbed on the adsorption rotor 36 which is rotatably provided in the regenerative deodorizing filter 30. As the adsorption rotor 36 is rotated, the gaseous substances are desorbed from the filter by the desorption means 300 associated with the desorption section 34, and thus the regenerative deodorizing filter is regenerated.

In other words, as air, which is controlled to a predetermined temperature by the heat exchanger 310 installed in association with the desorpiton section 34 of the regenerative deodorizing filter 30, is blown through the regenerative deodorizing filter, the gaseous substances, adsorbed on the region of the adsorption rotor 36 which is positioned at the adsorption section 34, are desorbed from the filter. Subsequently, the gaseous substances, which is desorbed from the filter, are purified and treated through the catalytic layer 324 of the catalytic oxidation unit 320.

At this point, the internal temperature of the catalytic oxidation unit 320 remains in a range from 50° C. to 400° C., and the air, in which the gaseous substances are oxidized and decomposed, still maintains the high temperature and passes through the heat exchanger 310. Thereafter, the air having the high temperature causes the air supplied to the desorption section 34 of the regenerative deodorizing filter 30 to be raised to a predetermined temperature, i.e., a temperature ranging from 50° C. to 300° C. through the heat-exchanging procedure, and is discharged outside using the desorption air transfer unit 330 or introduced into the upstream end of the regenerative deodorizing filter 30 for the retreatment.

Figure 7:
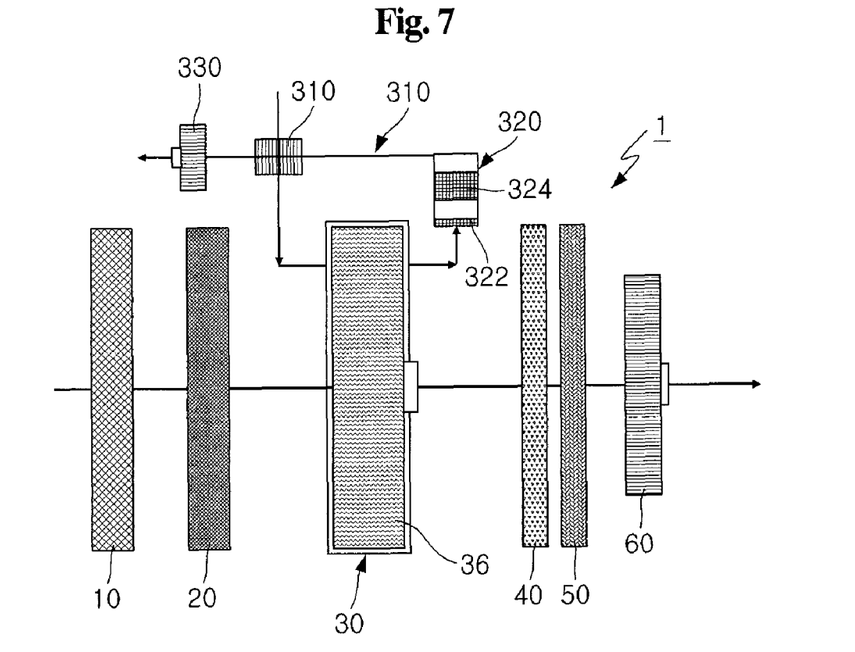
FIG. 7 is a view showing a variant embodiment of the third embodiment of the present invention, which is configured such that the flowing direction of air supplied to the desorption section of the regenerative deodorizing filter is reversed, as opposed to the air cleaner according to the third embodiment (see FIG. 6)

For reference, FIG. 7 shows a variant embodiment of the third embodiment of the present invention, which is configured such that the flowing direction of air supplied to the desorption section of the regenerative deodorizing filter is reversed, as opposed to the air cleaner according to the third embodiment (see FIG. 6). In this variant embodiment, since details relating to the configuration and the operation are the same as those of the third embodiment, the redundant description is omitted herein.

Figure 8:
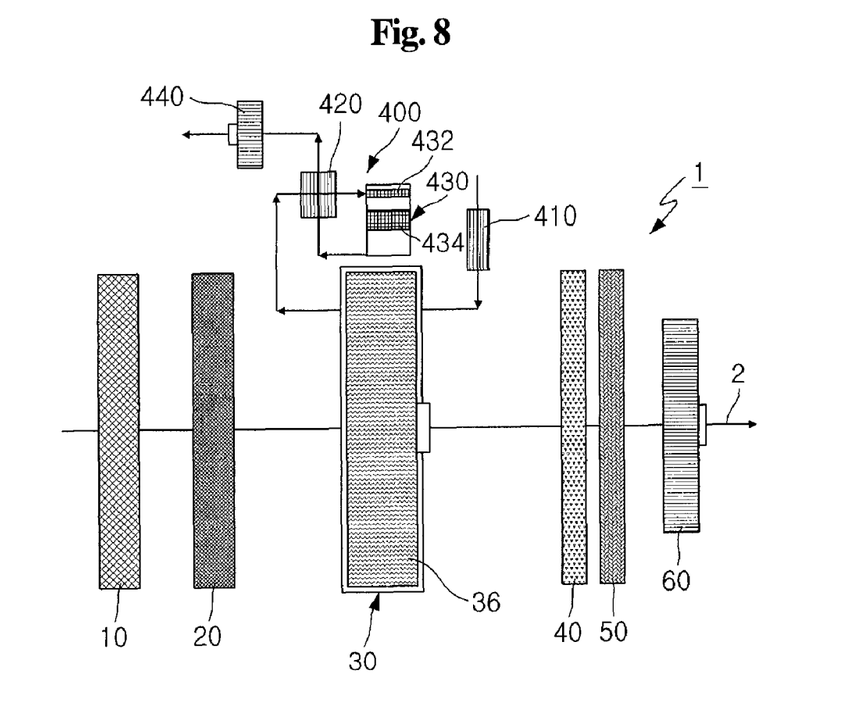
FIG. 8 is a schematic view showing a configuration of an air cleaner according to a fourth embodiment of the present invention.

FIG. 8 is a schematic view showing a configuration of an air cleaner according to a fourth embodiment of the present invention. As shown in the drawing, this embodiment is configured such that desorption means 400 further comprises a heating unit 410 for heating air supplied to the desorption section 34 of the regenerative deodorizing filter 30. In the description of the fourth embodiment of the present invention, the same reference numerals are used throughout the description to designate the same as or similar to components disclosed in the previous embodiments, and the redundant description relating to the components is omitted for clarity.

The desorption means 400 of the fourth embodiment of the present invention may comprise the heating unit 410 for heating the air, which is supplied to the desorption section 34 of the regenerative deodorizing filter 30, to a predetermined temperature ranging from 50° C. to 300° C., a heat exchanger 420 through which the air, which is heated by the heating unit 410 and contains gaseous substances desorbed from the desorption section 34 of the regenerative deodorizing filter 30, passes, a catalytic oxidation unit 430 for purifying and treating the air flowed from the heat exchanger 420, and a desorption air transfer unit 440 for discharging the purified air flowed from the catalytic oxidation unit 430 outside or introducing the air into the upstream end of the regenerative deodorizing filter 30 of the air cleaner again for the retreatment.

The heat exchanger 420 is configured such that the air flowed from the desorption section 34 passes therethrough in one direction while the air flowed from the catalytic oxidation unit 430 passes therethrough in another direction different from the one direction. As a result, the air flowed from the desorption section 34 can be heated to a higher temperature by virtue of the air passed through the catalytic oxidation unit 430 and thus having a high temperature.

Among the reference numerals in the drawing, which have not been mentioned, reference numeral 432 represents a heater incorporated in the catalytic oxidation unit, and reference numeral 434 represents a catalytic layer.

Figure 9:
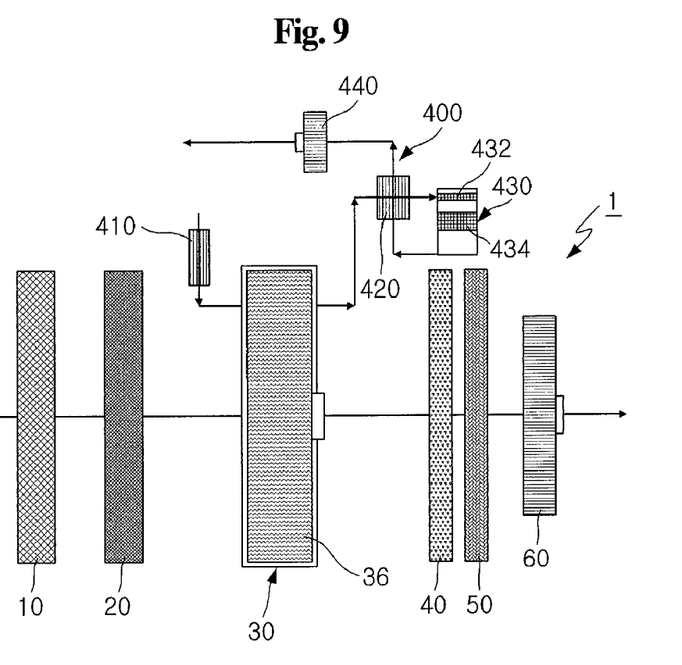
FIG. 9 is a view showing a variant embodiment of the fourth embodiment of the present invention, which is configured such that the flowing direction of air supplied to the desorption section of the regenerative deodorizing filter is reversed, as opposed to the air cleaner according to the fourth embodiment (see FIG. 8)

For reference, FIG. 9 shows a variant embodiment of the fourth embodiment of the present invention, which is configured such that the flowing direction of air supplied to the desorption section of the regenerative deodorizing filter is reversed, as opposed to the air cleaner according to the fourth embodiment (see FIG. 8). In this variant embodiment, since details relating to the configuration and the operation are the same as those of the fourth embodiment, the redundant description is omitted herein.

Figure 10:
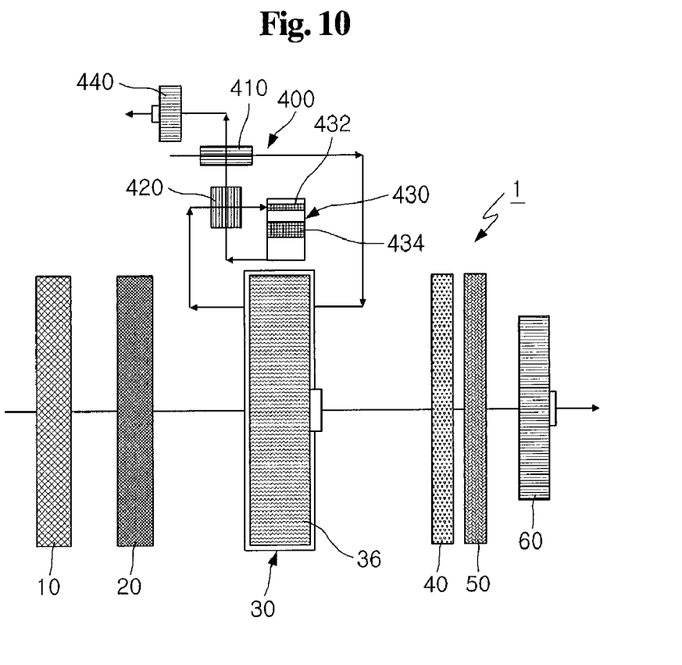
FIG. 10 is a schematic view showing a configuration of an air cleaner according to a fifth embodiment of the present invention.

FIG. 10 is a schematic view showing a configuration of an air cleaner according to a fifth embodiment of the present invention. This embodiment is configured such that, unlike the configuration of the air cleaner according to the fourth embodiment of the present invention, the heating unit 410, which is intended to supply heated air to the desorption section 34 of the regenerative deodorizing filter 30, is changed to be positioned between the heat exchanger 420 and the desorption air transfer unit 440. In the description of the fifth embodiment of the present invention, the same reference numerals are used throughout the description to designate the same as or similar to components disclosed in the previous embodiments, and the redundant description relating to the components is omitted for clarity.

More specifically, when the heating unit 410 is disposed between the heat exchanger 420 and the desorption air transfer unit 440, the air, which is flowed from the catalytic oxidation unit 430 and the heat exchanger 420 and is thus purified and heated due to the passage, passes through the heating unit 410 while exchanging heat with the air supplied to the desorption section 34 of the regenerative deodorizing filter 30, thus making it easy to heat the air, supplied to the desorption section 34 of the regenerative deodorizing filter 30, to the predetermined temperature raging from 50° C. to 300° C.

Figure 11:
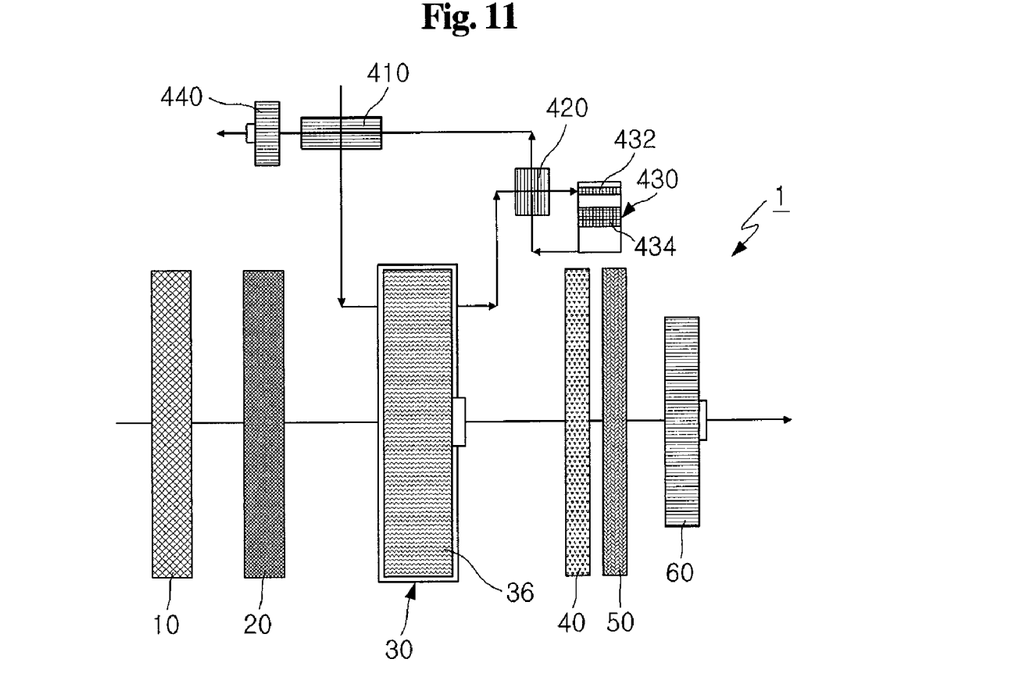
FIG. 11 is a view showing a variant embodiment of the fifth embodiment of the present invention, which is configured such that the flowing direction of air supplied to the desorption section of the regenerative deodorizing filter is reversed, as opposed to the air cleaner according to the fifth embodiment (see FIG. 10)

For reference, FIG. 11 shows a variant embodiment of the fifth embodiment of the present invention, which is configured such that the flowing direction of air supplied to the desorption section of the regenerative deodorizing filter is reversed, as opposed to the air cleaner according to the fifth embodiment (see FIG. 10). In this variant embodiment, since details relating to the configuration and the operation are the same as those of the fifth embodiment, the redundant description is omitted herein.

Figure 12:
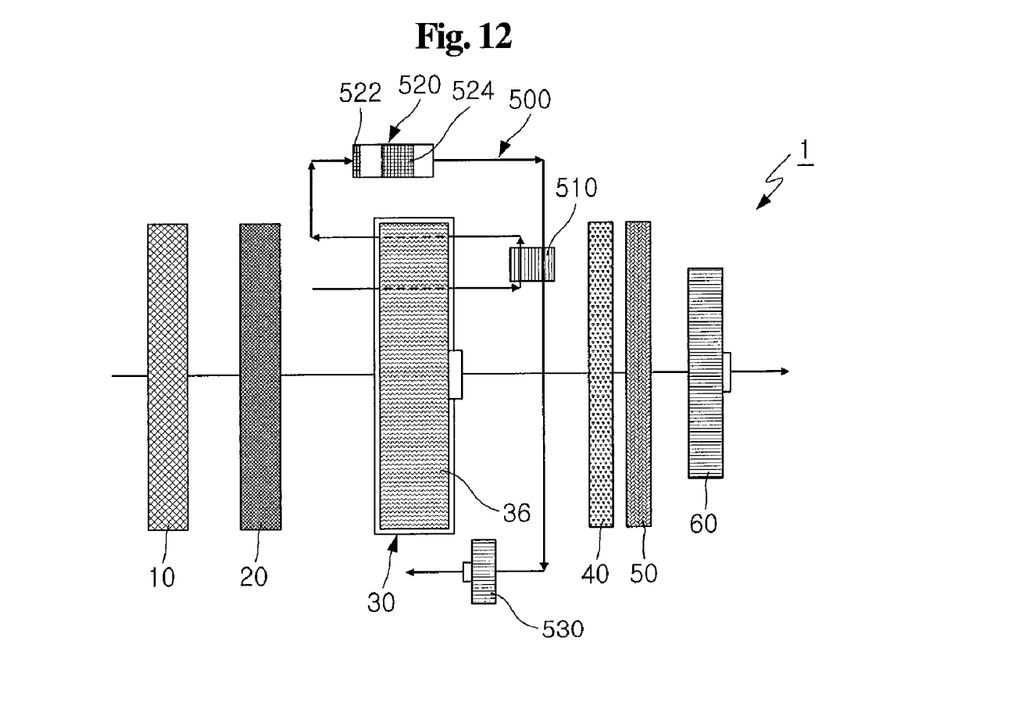
FIG. 12 is a schematic view showing a configuration of an air cleaner according to a sixth embodiment of the present invention.
Figure 13:
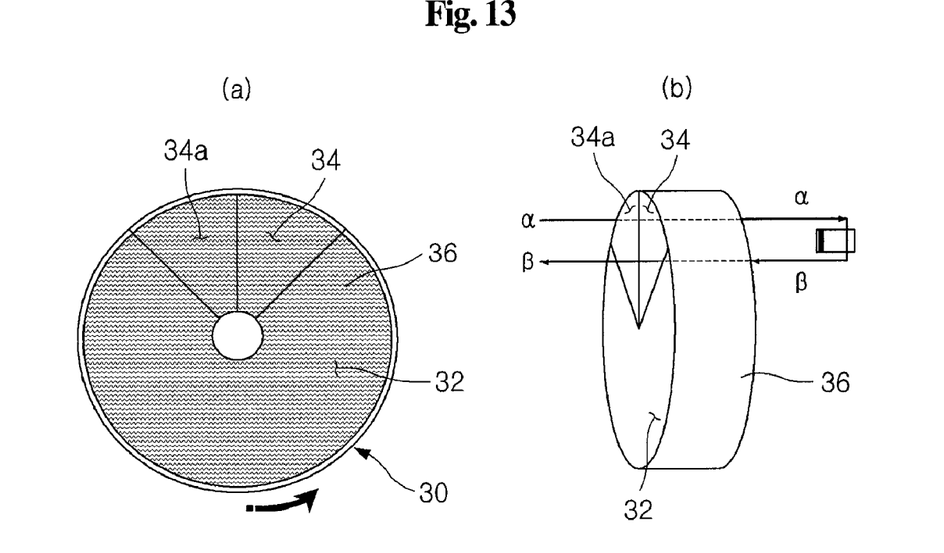
FIG. 13 shows a front view and a perspective view of a regenerative deodorizing filter of the air cleaner according to the sixth embodiment of the present invention.

FIG. 12 is a schematic view showing a configuration of an air cleaner according to a sixth embodiment of the present invention, and FIG. 13 shows a front view and a perspective view of a regenerative deodorizing filter of the air cleaner according to the sixth embodiment of the present invention.

The sixth embodiment of the present invention is configured such that the regenerative deodorizing filter 30 includes a cooling section 34a as a portion thereof so as to prevent the entire region of the adsorption rotor 36 from being excessively heated due to the passage of the heated air through the desorption section 34 of the regenerative deodorizing filter 30. This embodiment is substantially identical to the previous embodiments in configuration and operation with the exception of desorption means 500 adapted to desorb gaseous substances adsorbed on the area of the adsorption rotor 36 which is positioned at the desorption section 34 of the regenerative deodorizing filter 30. Accordingly, the same reference numerals are used throughout the description to designate the same as or similar to components disclosed in the previous embodiments, and the redundant description relating to the components is omitted for clarity.

As shown in FIG. 13, the regenerative deodorizing filter 30 includes the adsorption rotor 36 rotatably incorporated therein. Further, the regenerative deodorizing filter 30 comprises an adsorption section 32 which adsorbs gaseous substances on the circumferential region thereof, a desorption section 34 at which the gaseous substances are desorbed therefrom, and the cooling section 34a.

More specifically, the adsorption section 32 is defined by a circular segment of the regenerative deodorizing filter 30 having a predetermined circumferential angle, and the desorption section 34 and the cooling section 34a are defined by the remaining circular segment other than the adsorption section 32.

The desorption means 500, which is adapted to desorb the gaseous substances adsorbed on the adsorption rotor 36 and positioned at the desorption section 34 of the regenerative deodorizing filter 30, comprises a heating unit 510 for heating air supplied to the desorption section of the regenerative deodorizing filter 30 to a desorption temperature equal to or higher than an adsorption temperature, a desorption air treatment unit 520 for purifying and treating the air containing the gaseous substances desorbed from the desorption section 34, and a desorption air transfer unit 530 for blowing out the air flowed from the desorption air treatment unit 520.

In this regard, the air, which is to be supplied to the heating unit 510, is supplied through the cooling section 34a of the regenerative odorizing filter 30.

As the desorption air treatment unit 520, a catalytic oxidation unit including a heater 522 and a catalytic layer 524 is preferably applied.

The operation of the air cleaner according to the sixth embodiment of the present invention, which is constructed in the above-described manner, will be described below.

Air is heated to a predetermined temperature while passing through the heating unit 510 disposed beside a side of the desorption section 34 of the regenerative deodorizing filter 30, and is passed through the regenerative deodorizing filter 30. At this time, gaseous substances, adsorbed on the portion of the adsorption rotor 36 which is positioned at the desorption section 34, are desorbed therefrom and entrained in the air. The air containing the gaseous substances is purified and treated by the desorption air treatment unit 520, and then is discharged outside or introduced into the air cleaner 1 again by virtue of the desorption air transfer unit 530 for the retreatment.

As such, since the adsorption rotor 36 is configured to be rotatable, the entire area of the adsorption rotor is progressively passed over by the desorption section 34 by virtue of the rotation of the adsorption rotor, so that the gaseous substance adsorbed on the entire area of the adsorption rotor 36 can be desorbed therefrom, and can be thus regenerated.

Meanwhile, since the air, which is heated by the heating unit 510, is blown to the desorption section 34 while the adsorption rotor 36 continuously rotates and passes over the desorption section 34, there is a risk of overheating of the adsorption rotor 36 because of the continuous rotation of the adsorption rotor 36.

To overcome such a problem, air having an ambient temperature is supplied to the heating unit 510 through the cooling section 34a of the regenerative deodorizing filter 30, so that the supplied air cools the adsorption rotor 36 which is heated due to the air which passes through the desorption section 34 and has a high temperature, thus eliminating such a problem.

Figure 14:
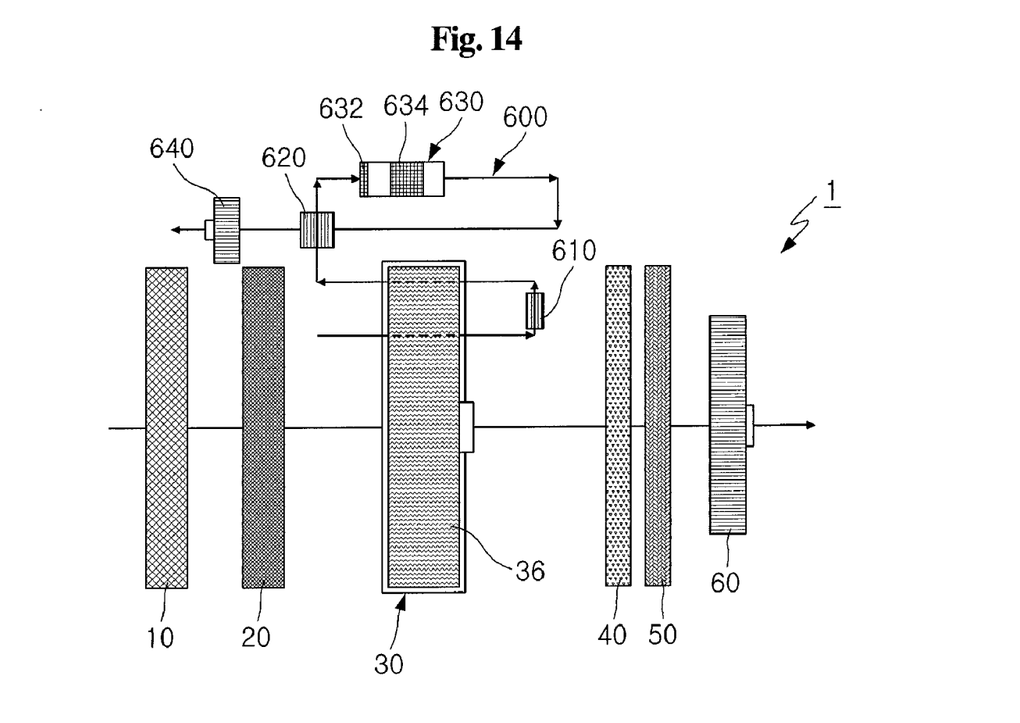
FIG. 14 is a schematic view showing an air cleaner according to a seventh embodiment of the present invention.

FIG. 14 is a schematic view showing an air cleaner according to a seventh embodiment of the present invention, which is a modification of the above-described sixth embodiment. In the description of this modification, the same reference numerals are used throughout the description to designate the same as or similar to components disclosed in the first embodiment, and the redundant description relating to the components is omitted for clarity.

As shown in the drawing, desorption means 600 of the air cleaner according to the seventh embodiment of the present invention comprises a heating unit 610 for heating the air, which is supplied to the desorption section 34 of the regenerative deodorizing filter 30, to a predetermined desorption temperature higher than a adsorption temperature, a heat exchanger 620 through which the air, which contains gaseous substances desorbed from the desorption section 34, passes, a desorption air treatment unit 630 for purifying and treating the air flowed from the heat exchanger 620, and a desorption air transfer unit 640 for discharging the air, which has been passed through the desorption air treatment unit 630 and the heat exchanger 620, outside, or introducing the air into the air cleaner again for the retreatment.

The heat exchanger 620 is configured such that the air, which has passed through the desorption section 34 and thus contains the gaseous substance therein, flows therethrough in one direction while the air, which has passed through the desorption air treatment unit 630 and thus purified and treated, flows therethrough in another direction perpendicular to the one direction.

As a result, the air flowed from the desorption section 34 can be heated to a higher temperature while passing through the desorption air treatment unit 630, by virtue of the exchange of heat with the air, which has a temperature ranging from 50° C. to 400° C., and the heated air is supplied to the desorption air transfer unit 640.

Among the reference numerals in the drawing, which have not been mentioned, reference numeral 632 represents a heater incorporated in the desorption air treatment unit, and reference numeral 634 represents a catalytic layer.

Since the operation of purifying and treating the air is the same as that of the previous embodiments, the redundant description thereof is omitted for clarity.

Figure 15:
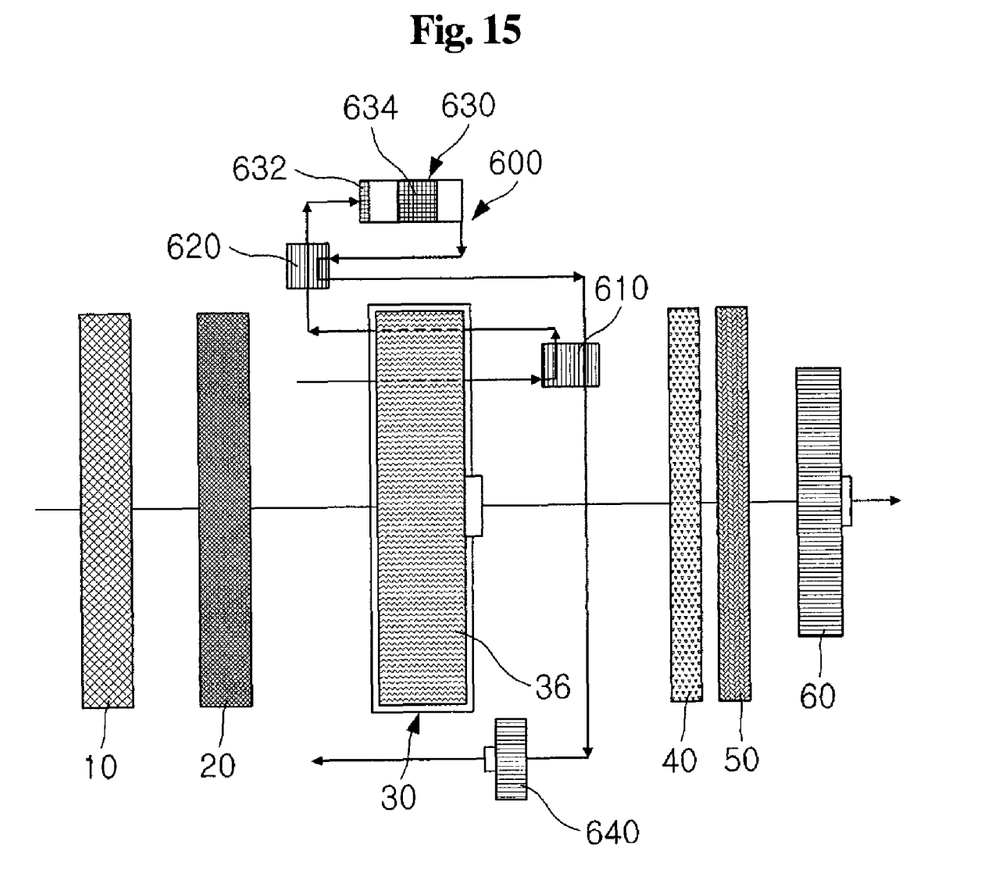
FIG. 15 is a schematic view showing an air cleaner according to an Eighth embodiment of the present invention.

FIG. 15 is a schematic view showing an air cleaner according to an Eighth embodiment of the present invention, which is a modification of the above-described sixth and seventh embodiments. In the description of this modification, the same reference numerals are used throughout the description to designate the same as or similar to components disclosed in the first embodiment, and the redundant description relating to the components is omitted for clarity.

As shown in the drawing, desorption means 600 of the air cleaner according to the Eighth embodiment of the present invention comprises a heating unit 610 for heating the air, which is supplied to the desorption section 34 of the regenerative deodorizing filter 30, to a predetermined desorption temperature higher than a adsorption temperature, a heat exchanger 620 through which the air, which contains gaseous substances desorbed from the desorption section 34, passes, a desorption air treatment unit 630 for purifying and treating the air flowed from the heat exchanger 620, and a desorption air transfer unit 640 for discharging the air, which has been passed through the desorption air treatment unit 630 and the heat exchanger 620 and then has passed through the heating unit 610.

The heat exchanger 620 is configured such that the air, which has passed through the desorption section 34 and thus contains the gaseous substance therein, flows therethrough in one direction while the air, which has passed through the desorption air treatment unit 630 and thus purified and treated, flows therethrough in another direction perpendicular to the one direction.

As a result, the air flowed from the desorption section 34 can be heated to a higher temperature while passing through the heat exchanger 620, by virtue of the exchange of heat with the air, which has a temperature ranging from 50° C. to 400° C., and the heated air is supplied to the desorption air treatment unit 630.

Subsequently, the air passes through the desorption air treatment unit 630 and the heat exchanger 620, and then passes through the heat exchanger 610 again while exchanging heat with the air passing through the regenerative deodorizing filter 30.

Therefore, the air supplied to the heating unit 610, which has been passed through the cooling section 34a of the regenerative deodorizing filter 30, is heated by virtue of the exchanging heat with the air, which has been passed through the desorption air treatment 630 and the heat exchanger 620 and thus has been heated to a high temperature.

For reference, among the reference numerals in the drawing, which have not been mentioned, reference numeral 632 represents a heater incorporated in the desorption air treatment unit, and reference numeral 634 represents a catalytic layer.

Since the operation of purifying and treating the air is the same as that of the previous sixth and seventh embodiments, the redundant description thereof is omitted for clarity.

The invention claimed is:

1. An air cleaner comprising:
   at least one filter to purify and treat particulate substances contained in air introduced therein;
   a regenerative deodorizing filter to adsorb gaseous substances contained in the air introduced therein for purification and treatment; and
   desorption means to desorb and treat the gaseous substances adsorbed on the regenerative deodorizing filter so that the regenerative deodorizing filter is continuously regenerated,
   wherein the regenerative deodorizing filter comprises an adsorption section defined by a circular segment having a predetermined circumferential angle, and a desorption section defined by the remaining circular segment other than the adsorption section, and the regenerative deodorizing filter includes a rotary rotor, which is rotatably installed in the regenerative deodorizing filter,
   wherein the desorption means comprises:
   a heating unit to heat air supplied to the desorption section of the regenerative deodorizing filter;
   a heat exchanger through which the air, which is passed through the heating unit and is passed through the desorption section while entraining gaseous substances therein, passes;
   a desorption air treatment unit to purify and treat gaseous substances contained in the air, which is passed through the heat exchanger and is introduced therein; and,
   an air transfer unit to enable the air, which is purified and treated by the desorption air treatment unit and is passed through the heat exchanger while exchanging heat with air passed through the desorption section of the regenerative deodorizing filter, to be passed through the heating unit so as to be heat exchanged with air heated by the heating unit, and then to be discharged outside or to be introduced into the regenerative deodorizing filter for retreatment.

2. The air cleaner according to claim 1, wherein the rotary rotor is made of single component or multiple components selected from among zeolite, activated alumina, porous silica, activated carbon and diatomite, which have a high adsorptive capacity with respect to gaseous substances.

3. The air cleaner according to claim 1, wherein the rotary rotor comprises a support having a low air resistance, and single component or multiple components selected from among zeolite, activated alumina, porous silica, activated carbon and diatomite, which are applied to the support and have a high adsorptive capacity with respect to gaseous substances.

4. The air cleaner according to claim 1, wherein the heating unit is positioned between the heat exchanger and the air transfer unit so that air passed through the heat exchanger exchanges heat with air supplied to the desorption section of the regenerative deodorizing filter.

5. The air cleaner according to claim 1, wherein the regenerative deodorizing filter comprises the adsorption section defined by a circular segment having a predetermined circumferential angle, and cooling and desorption sections defined by the remaining circular segment other than the adsorption section, and the regenerative deodorizing filter includes the rotary rotor, which is rotatably installed in the regenerative deodorizing filter.

6. The air cleaner according to claim 5, wherein the desorption means comprises:
the heating unit to heat air passed through the cooling section of the regenerative deodorizing filter and to supply the air to the desorption section;
the heat exchanger to exchange heat with the air, which is heated by the heating unit and is passed through the desorption section while entraining gaseous substances therein;
the desorption air treatment unit to purify and treat the gaseous substances contained in the air passed through the heat exchanger; and
air transfer unit to enable the air, which is purified and treated by the desorption air treatment unit and is passed through the heat exchanger while exchanging heat with air passed through the desorption section, to be passed through the heating unit so as to be heat exchanged with air heated by the heating unit, and then to be discharged outside or to be introduced into the regenerative deodorizing filter for retreatment.

7. The air cleaner according to claim 1, wherein the desorption means further comprises:
a pressure-regulating unit to regulate a pressure of air supplied to the regenerative odorizing filter.

8. The air cleaner according to claim 1, wherein the desorption air treatment unit includes one or more selected from among a catalytic oxidation unit, an absorbent adsorption unit, a cold condensation unit, a photocatalytic treatment unit and an ozone oxidation unit.

9. The air cleaner according to claim 1, wherein the desorption air treatment unit is a catalytic oxidation unit which comprises a heater to heat interior air to a predetermined temperature, and a catalytic layer to catalytically oxidize and thus burn gaseous substances contained in air introduced therein.

10. The air cleaner according to claim 1, wherein the air supplied to the desorption section of the regenerative deodorizing is heated to a temperature ranging from 50° C. to 300° C.

11. The air cleaner according to claim 1, wherein the air passed through the desorption air treatment unit is maintained in a temperature ranging from 50° C. to 400° C.

12. The air cleaner according to claim 9, wherein the heater preheats the interior of the desorption air treatment unit to a temperature of 50° C. or more.

13. The air cleaner according to claim 1, further comprising a post-treatment filter which is configured to purify and treat substances, which remain in the air passed through the regenerative deodorizing filter and introduced therein and is not yet purified and treated, and to apply negative ions and far infrared rays to the air.

14. A method of regenerating the regenerative deodorizing filter of the air cleaner according to claim 1, the method comprising:
(a) purifying and treating particulate substances contained in introduced air using a filter;
(b) purifying and treating gaseous substances contained in introduced air using a regenerative deodorizing filter; and
(c) desorbing the gaseous substances adsorbed on the regenerative deodorizing filter for purification and treatment, thus enabling continuous regeneration of the regenerative deodorizing filter.

15. The air cleaner according to claim 1, further comprising a gas sensor for detecting the concentration of the gaseous substances absorbed on the regenerative deodorizing filter so that whether the regenerative deodorizing filter can be regenerated is determined based on the concentrations detected by the gas sensor.

* * * * *

UNITED STATES PATENT AND TRADEMARK OFFICE
CERTIFICATE OF CORRECTION

PATENT NO.       : 8,366,803 B2
APPLICATION NO. : 12/597375
DATED            : February 5, 2013
INVENTOR(S)      : Hyun Jae Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 547 days.

Signed and Sealed this
First Day of September, 2015

Michelle K. Lee
*Director of the United States Patent and Trademark Office*